United States Patent
Minami

(10) Patent No.: US 10,129,430 B2
(45) Date of Patent: Nov. 13, 2018

(54) INFORMATION PROCESSING APPARATUS AND DATA ARRANGEMENT METHOD FOR CREATING AN ELECTRONIC WATERMARK

(71) Applicant: Kohichiroh Minami, Kanagawa (JP)

(72) Inventor: Kohichiroh Minami, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/497,525

(22) Filed: Apr. 26, 2017

(65) Prior Publication Data

US 2017/0339303 A1 Nov. 23, 2017

(30) Foreign Application Priority Data

May 19, 2016 (JP) .................................. 2016-100644

(51) Int. Cl.
*H04N 1/32* (2006.01)
(52) U.S. Cl.
CPC ....... *H04N 1/32352* (2013.01); *H04N 1/3224* (2013.01); *H04N 1/32192* (2013.01); *H04N 1/32261* (2013.01); *H04N 2201/0094* (2013.01); *H04N 2201/327* (2013.01); *H04N 2201/3233* (2013.01)
(58) Field of Classification Search
CPC combination set(s) only.
See application file for complete search history.

(56) References Cited

U.S. PATENT DOCUMENTS

| 2007/0079124 | A1 | 4/2007 | Maeno |
| 2008/0080009 | A1* | 4/2008 | Masui .................. G06T 1/0028 |
| | | | 358/3.28 |
| 2017/0345117 | A1* | 11/2017 | Shindoh ............... G06T 1/0021 |

FOREIGN PATENT DOCUMENTS

| JP | 2005-150815 | 6/2005 |
| JP | 2007-052471 | 3/2007 |

OTHER PUBLICATIONS

U.S. Appl. No. 15/452,087, filed Mar. 7, 2017.

* cited by examiner

*Primary Examiner* — Barbara Reinier
(74) *Attorney, Agent, or Firm* — IPUSA, PLLC

(57) ABSTRACT

An information processing apparatus is for arranging at least one dot, which expresses information relating to image data, in the image data. The information processing apparatus includes processing circuitry configured to create an edge image of the image data; determine a position near an edge in the edge image to be a position of the at least one dot; and arrange the at least one dot at the determined position in the image data.

13 Claims, 15 Drawing Sheets

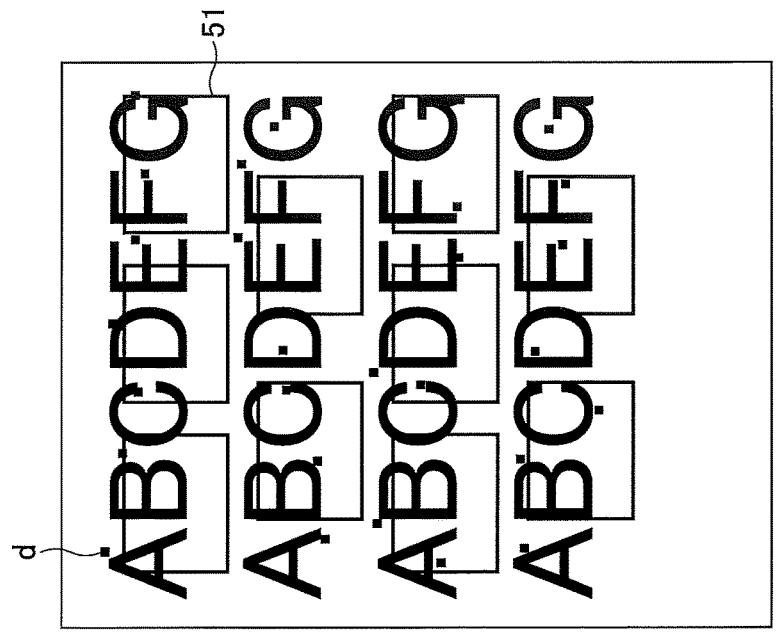
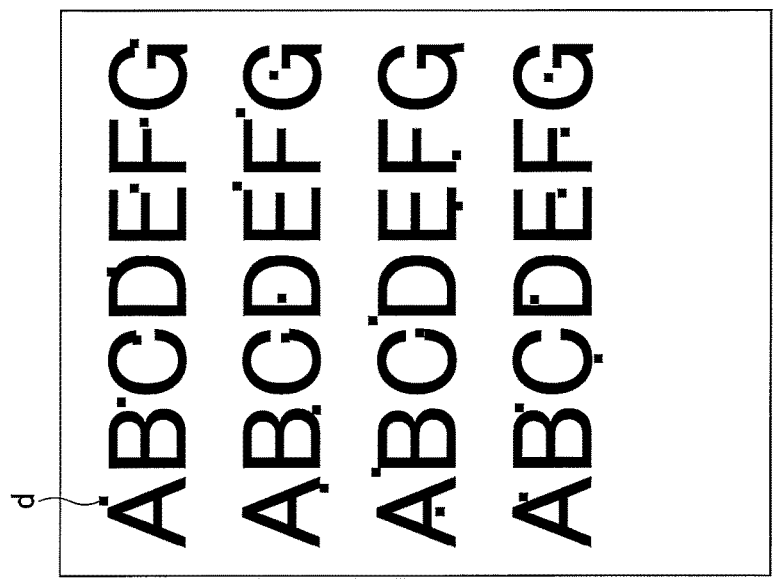
FIG.14A
FIG.14B

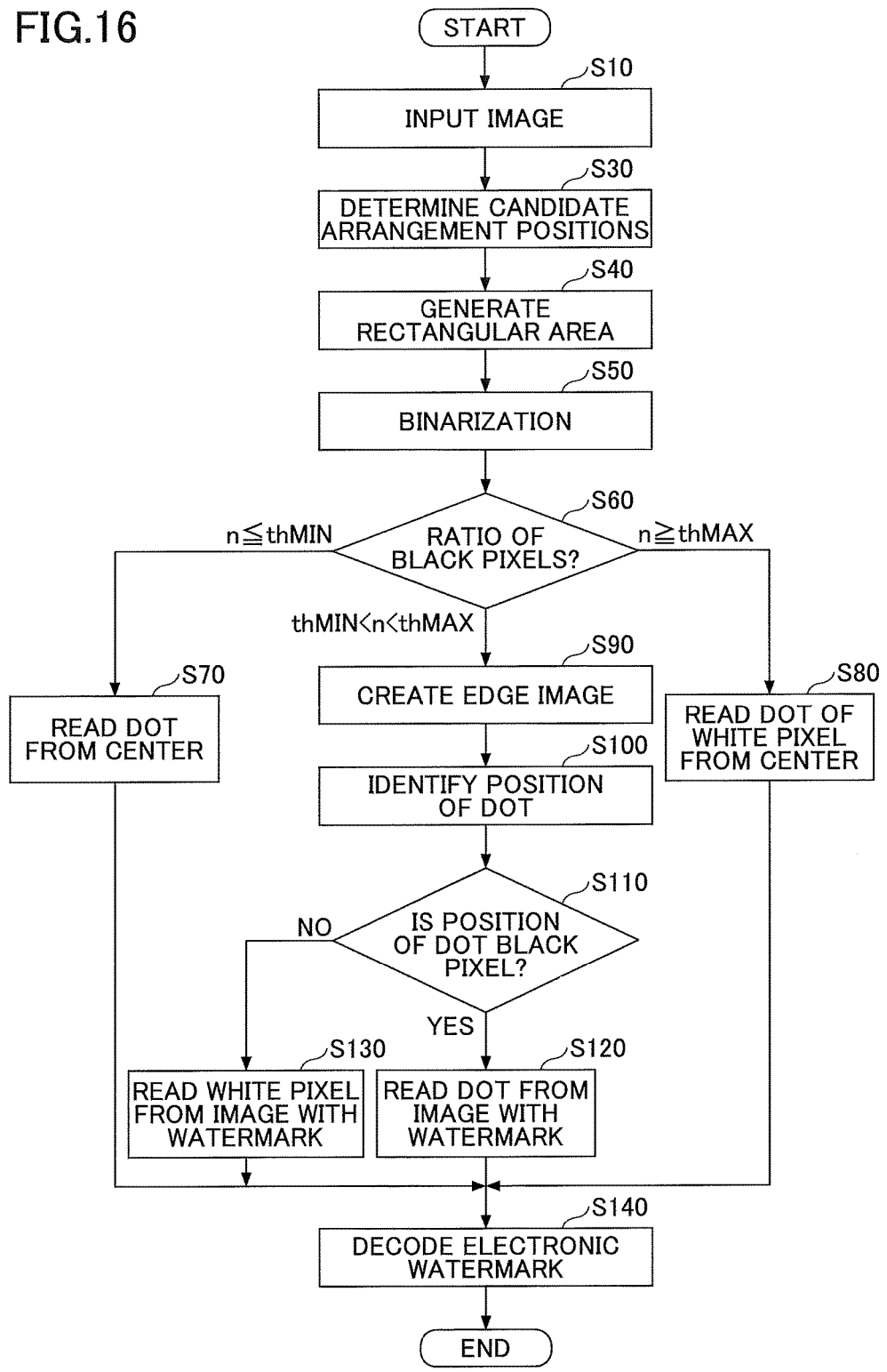

INFORMATION PROCESSING APPARATUS AND DATA ARRANGEMENT METHOD FOR CREATING AN ELECTRONIC WATERMARK

CROSS-REFERENCE TO RELATED APPLICATION

The present application claims priority under 35 U.S.C. § 119 to Japanese Patent Application No. 2016-100644, filed on May 19, 2016, the contents of which are incorporated herein by reference in their entirety.

BACKGROUND OF THE INVENTION

1. Field of the Invention

The present invention relates to an information processing apparatus and a data arrangement method.

2. Description of the Related Art

There is a technology of inputting an electronic watermark in an image to be printed. An electronic watermark is a technology of arranging information relevant to an image in the image, or the information that is arranged in the image. Printed matter expresses an image by an assembly of dots, and therefore an electronic watermark is arranged by arranging microscopic dots in the image. Microscopic dots are arranged in the original image before an electronic watermark is arranged, and therefore the electronic watermark arranged in the printed matter is known to be conspicuous.

As a technology of arranging an electronic watermark in printed matter, there is devised a technology of using edges of an image (see, for example, Patent Document 1). Patent document 1 discloses a watermark information embedding apparatus that defines a symbol of a pattern by edge components having strong frequency components, when forming a dot pattern formed by a plurality of pixels having a fixed frequency and a fixed direction.

Patent Document 1: Japanese Unexamined Patent Application Publication No. 2005-150815

SUMMARY OF THE INVENTION

An aspect of the present invention provides an information processing apparatus and a data arrangement method in which one or more of the disadvantages of the related art are reduced.

According to one aspect of the present invention, there is provided an information processing apparatus for arranging at least one dot, which expresses information relating to image data, in the image data, the information processing apparatus including processing circuitry configured to create an edge image of the image data; determine a position near an edge in the edge image to be a position of the at least one dot; and arrange the at least one dot at the determined position in the image data.

BRIEF DESCRIPTION OF THE DRAWINGS

Other objects, features and advantages of the present invention will become more apparent from the following detailed description when read in conjunction with the accompanying drawings, in which:

FIGS. 6A through 6C are for describing arrangement examples of dots included in an electronic watermark, in which FIG. 6A illustrates an example of an original image, FIG. 6B illustrates an image with a watermark according to a comparison example, and FIG. 6C illustrates an image with a watermark according to an embodiment of the present invention;

FIGS. 14A and 14B are for describing the operation of reading of an electronic watermark according to an embodiment of the present invention;

FIG. 16 is an example of a flowchart indicating the operation procedures performed by the image forming apparatus when decoding an electronic watermark according to an embodiment of the present invention.

DETAILED DESCRIPTION OF THE PREFERRED EMBODIMENTS

In the method of creating an electronic watermark of the related art, microscopic dots are arranged regardless of the positions of characters and images. Therefore, there has been a problem in that the arranged microscopic dots may become conspicuous, depending on the positions where the microscopic dots are arranged.

A problem to be solved by an embodiment of the present invention is to provide an information processing apparatus that can create an electronic watermark in which the microscopic dots are inconspicuous.

Embodiments of the present invention will be described by referring to the accompanying drawings.

Figure 1A:
FIGS. 1A through 1D are examples of diagrams for describing an electronic watermark created by an image forming apparatus, according to an embodiment of the present invention.
Figure 1B:
Figure 1C:
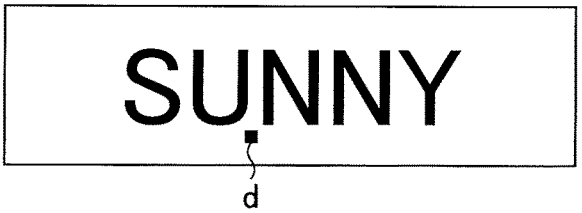

FIGS. 1A through 1D are examples of diagrams for describing an electronic watermark created by an image forming apparatus according to the present embodiment. FIG. 1A illustrates an example of an original image in which an electronic watermark is not arranged. When arranging an electronic watermark, the image forming apparatus creates an edge image of the original image. FIG. 1B illustrates an example of an edge image. An edge image is an image obtained by performing a predetermined filter process on the original image, and extracting pixels having an edge intensity that is greater than or equal to a predetermined value. Furthermore, pixels having an edge intensity that is greater than or equal to a predetermined value are referred to as an edge. As illustrated in FIG. 1B, the outlines of characters are extracted as edges.

Figure 10:
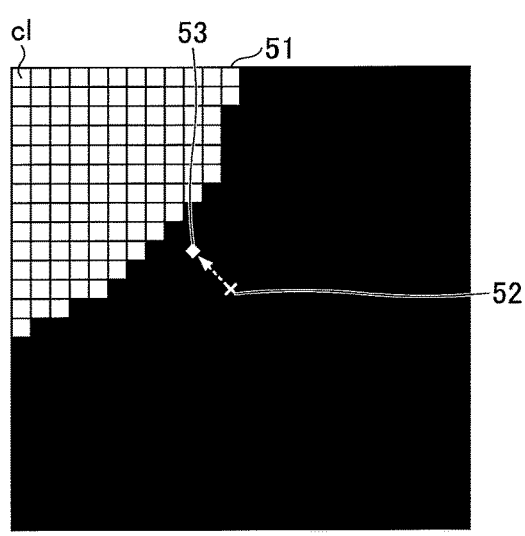
FIG. 10 is for describing an example of the dot when the arrangement position is a black pixel according to an embodiment of the present invention.

For example, the image forming apparatus of the related art delimits an original image by a rectangle, and arranges a dot d at a determined position in the rectangle, to arrange an electronic watermark. FIG. 10 illustrates an example of the arranged dot d. As a matter of explanation, FIG. 10 illustrates only one dot d; however, in reality, multiple dots d are arranged. In FIG. 10, the dot d is arranged without considering the positions of the characters, and therefore the relative position of the dot d with respect to the characters is random, and the dot d may be conspicuous.

Figure 1D:
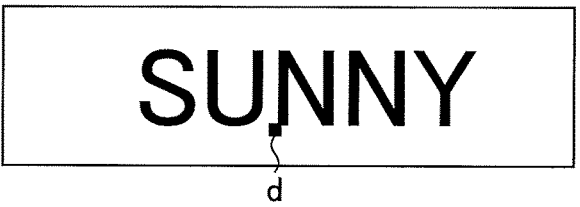

On the other hand, an image forming apparatus 10 (FIG. 2) according to the present embodiment arranges the dot d near the edge in the original image. FIG. 1D illustrates the dot d arranged near an edge. In FIG. 1D, the dot d is illustrated as a large dot as a matter of convenience; however, in reality, the dot has a size that cannot be recognized by the naked eye, and therefore to the human's eyes, the edge and the dot d appear to be integrated. Accordingly, when a user looks at an image having an electronic watermark, the strangeness caused by the dot d is mitigated in the example of FIG. 1D compared to the example of FIG. 10, and therefore the dot d included in the electronic watermark can be less conspicuous in the example of FIG. 1D.

Terminology

Information relevant to image data is to be information that has some relationship with the original image. Examples of the information relevant to image data include information accompanying the original image such as meta data of the original image, information such as a file name assigned to the original image, information of the creator or the owner of the original image, and information relevant to the time and date and the location of creating the original image, etc. Specifically, electronic data and detailed information described below are examples of the information relevant to image data.

Arranging data or dots means that the data or dots are arranged as information that can be detected by at least a reading device such as a scanner in the printed image. That is, a human being does not have to visually recognize the arranged data or dots. Specifically, arranging data or dots is performed by forming one or more pixels, adding pixels, recording pixels, printing pixels, and printing characters with pixels, etc. Furthermore, arranging data or dots may be idiomatically expressed as "embedding" data or dots.

The dot d is a microscopic dot that can be arranged as an element of an electronic watermark by the image forming apparatus. The dot d is the minimum pixel or an assembly of a plurality of pixels that can be formed by the image forming apparatus. The shape of the dot d may be any shape, such as a circle or a rectangle.

Near means that the distance between two dots is within a predetermined range. In the present embodiment, near means that the distance between an edge and the dot d is within a predetermined range. For example, a pixel that is closest to an edge is referred to as a near pixel. Furthermore, the pixel may be above an edge, adjacent to an edge, or spaced apart from an edge by one pixel. Furthermore, in the present embodiment, the purpose of arranging the dot d near an edge is to make the dot d become inconspicuous. Therefore, the determination of whether the dot d is near an edge may vary according to, for example, the size of the character. For example, as the size of the character increases, the distance from the edge considered as "near" may increase.

<System Configuration>

Figure 2:
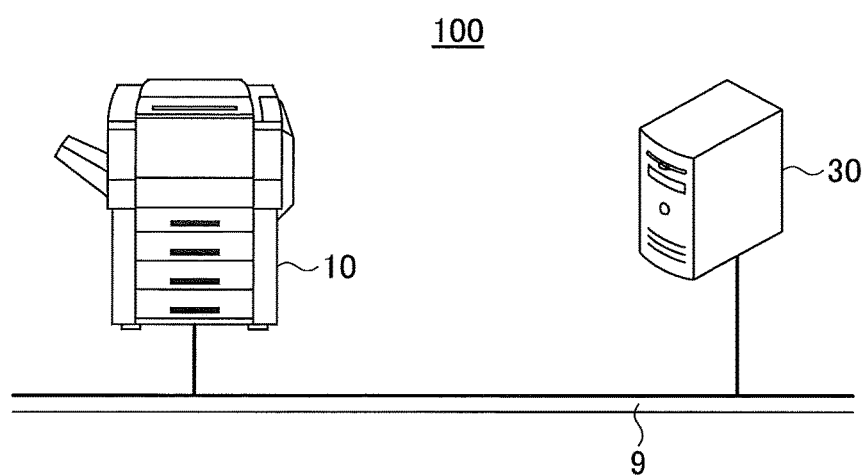
FIG. 2 illustrates an example of a system configuration of an image processing system according to an embodiment of the present invention.

FIG. 2 illustrates an example of a system configuration of an image processing system 100. The image processing system 100 includes the image forming apparatus 10 and a server 30 that are communicably coupled to each other via a network 9. The network 9 is formed by including at least one of a Local Area Network (LAN) of a company in which the image forming apparatus 10 is installed, a provider network of a provider that couples the LAN to the Internet, and a line provided by a line enterprise, etc. When the image forming apparatus 10 and the server 30 are directly coupled to a telephone network or a mobile phone network without involving a LAN, the image forming apparatus 10 and the server 30 can be coupled to a provider network without involving a LAN. Furthermore, the network 9 also includes a Wide Area Network (WAN) and the Internet. The network 9 may be wired or wireless, or may be a combination of wired and wireless networks. Furthermore, the image forming apparatus 10 and the server 30 may be coupled by a communication cable such as a Universal Serial Bus (USB) cable, instead of by the network 9.

The image forming apparatus 10 arranges electronic data in an original image as an electronic watermark, and sends the original image in which the electronic watermark has been arranged (hereinafter referred to as an "image with a watermark") and detailed information relevant to the original image, to the server 30. Furthermore, the image forming apparatus 10 reads the electronic watermark from the image with a watermark and decodes the electronic data. The detailed information includes the electronic data that is arranged as an electronic watermark, and also includes information that cannot be arranged by the image forming apparatus 10 due to the restriction in the capacity of the electronic watermark.

The content of the electronic data that is arranged as an electronic watermark may vary according to the purpose of the electronic watermark; however, the information relevant to the original image is the electronic data. For example, the electronic data includes information such as the creator of the original image, the owner of the original image, the creation time and date of the original image, the creation location of the original image, the contact number of the creator of the original image, the link destination, the link source, the access authority, and the storage time period, etc. The electronic data is part of the information relevant to the original image, and the detailed information may include all of the information relevant to the original image. However, the electronic data and the detailed information may be the same.

Note that the image forming apparatus 10 is an apparatus having a printing function of forming an image and printing the image on a sheet material such as a sheet. Furthermore, when the image forming apparatus 10 decodes the electronic data, the image forming apparatus 10 includes a function of reading an original document. For example, the image forming apparatus 10 may be referred to as a printer, a copier, a scanner device, or a fax machine. Furthermore, the image forming apparatus 10 may include one or more of these functions. In this case, the image forming apparatus 10 is referred to as a Multifunction Peripheral (MFP), etc. Furthermore, the image forming apparatus 10 may be referred to as an image processing apparatus meaning that the image forming apparatus 10 processes images.

The server 30 is to be a so-called information processing apparatus including a communication function. Furthermore, when the server 30 does not include a communication function, and the image forming apparatus 10 stores the original image and the detailed information in a portable storage medium and the server 30 reads the original image and the detailed information from the storage medium, the server 30 and the image forming apparatus 10 do not have to communicate with each other. The server 30 manages the image with a watermark and the detailed information in association with each other.

Note that the image forming apparatus 10 may merely be an information processing apparatus. Even an information processing apparatus can arrange an electronic watermark in the original image. Furthermore, an information processing apparatus such as the server 30 may arrange an electronic watermark in the original image and the image forming apparatus 10 may print the image. Furthermore, even when the image forming apparatus 10 is merely an information processing apparatus, the image forming apparatus 10 may read an electronic watermark from an image with a watermark read by a scanner device, and decode the electronic data. Furthermore, the image forming apparatus 10 may read an image with a watermark, and the server 30 may decode the electronic data.

<Hardware Configuration>

Figure 3:
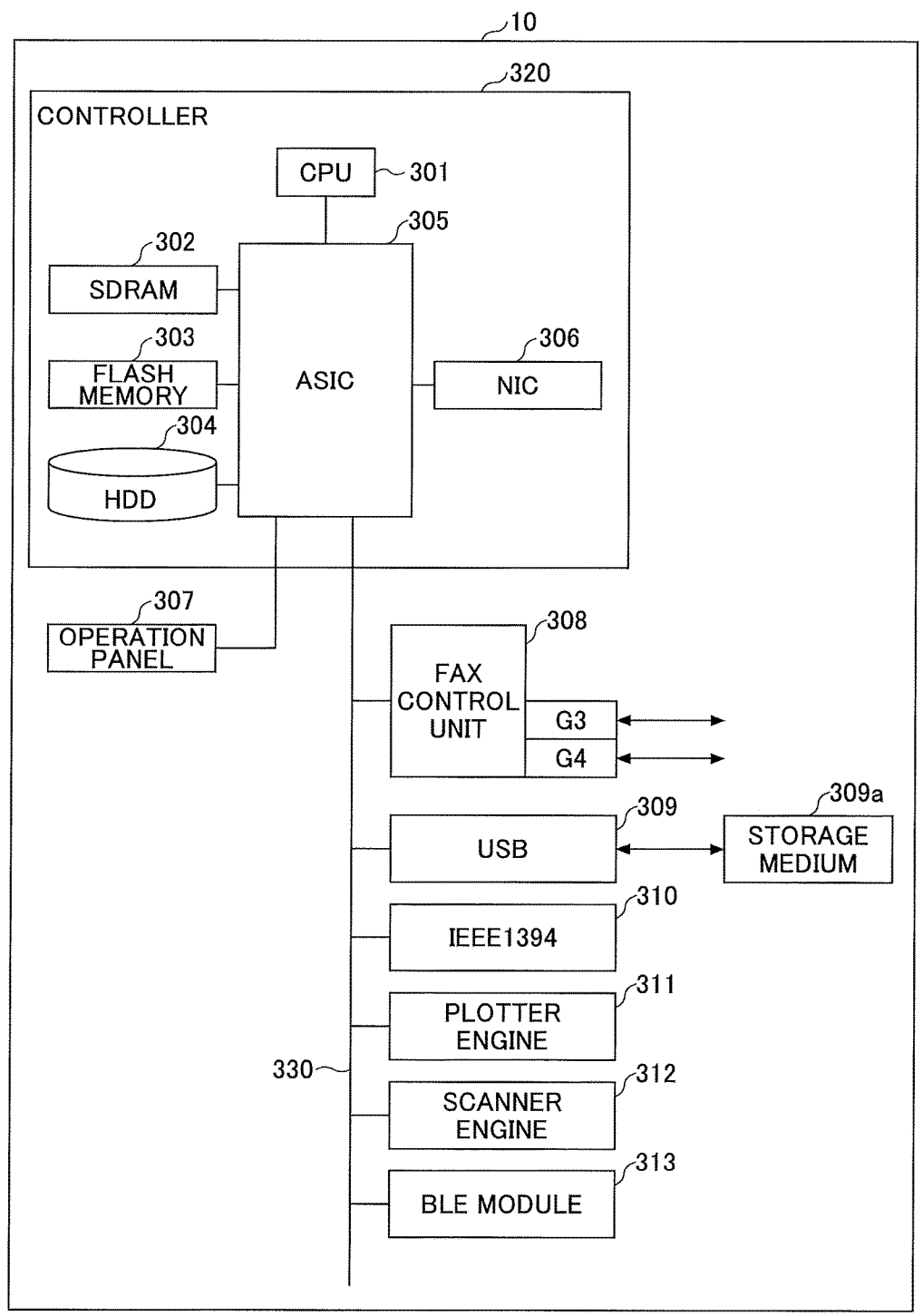
FIG. 3 illustrates a hardware configuration of the image forming apparatus according to an embodiment of the present invention.

FIG. 3 illustrates a hardware configuration of the image forming apparatus 10 according to an embodiment. The image forming apparatus 10 includes a controller 320. The controller 320 includes a CPU (Central Processing Unit) 301, an ASIC (Application Specific Integrated Circuit) 305, a synchronous dynamic random access memory (SDRAM) 302, a flash memory 303, a Hard Disk Drive (HDD) 304, and a Network Interface Card (NIC) 306.

The ASIC 305 is a multifunctional device board including a CPU interface, an SDRAM interface, a local bus interface, a Peripheral Component Interconnect (PCI) bus interface, a Media Access Controller (MAC), and a HDD interface, etc.

The CPU 301 reads various programs from the HDD 304 via the ASIC 305, and executes the programs. The SDRAM 302 functions as a program memory for storing various programs, and a work memory used when the CPU 301 executes various programs, etc. Note that a dynamic random access memory (DRAM) and an SDRAM may be used instead of the SDRAM 302.

The flash memory 303 is a non-volatile memory that stores a boot loader (boot program) for activating the image forming apparatus 10 and an operating system (OS). Furthermore, the flash memory 303 functions as an application memory for storing various programs. Furthermore, the flash memory 303 functions as a service memory for storing software of various services (a copy service, a print service, and a fax service, etc.). Furthermore, the flash memory 303 functions as a firm memory for storing firmware and a data memory for storing network addresses and machine model numbers, etc.

Note that other non-volatile memories may be used instead of the flash memory 303, such as a non-volatile random access memory (RAM) in which a backup circuit using a RAM and a battery is integrated, and an Electrically Erasable Programmable Read-Only Memory (EEPROM), etc.

The HDD 304 is a non-volatile storage medium that stores data, regardless of whether the power of the image forming apparatus 10 is on or off. The HDD 304 records programs and data other than the programs and data stored in the flash memory 303. Note that the HDD 304 may be used as a firm memory.

The NIC 306 is a communication device used for coupling the image forming apparatus 10 to the LAN. The NIC 306 may be referred to as a network card. Specifically, there is known an Ethernet (registered trademark) card. The NIC 306 may be detachably attached to the image forming apparatus 10, or may be fixed to the image forming apparatus 10. Furthermore, the NIC 306 may be an external device that is externally attached to the image forming apparatus 10.

An operation panel 307 is coupled to the controller 320. The operation panel 307 includes various operation keys, a liquid crystal display (LCD) as a display device or a cathode-ray tube (CRT) character display device, and a touch panel. The operation panel 307 is used by the user for instructing various instructions in the image forming apparatus 10.

Furthermore, the following elements are coupled to the controller 320 via a PCI bus 330. Specifically, a fax control unit 308, a USB 309 to which a storage medium 309*a* is detachably attached, an IEEE1394 310, a plotter engine 311, a scanner engine 312, and a Bluetooth Low Energy (BLE) module 313, are coupled to the controller 320. Accordingly, the image forming apparatus 10 can provide services such as a copy service, a print service, and a fax service, etc. The plotter engine 311 may use either an electrophotographic method or an inkjet method.

Note that the configuration illustrated in FIG. 3 is one example; the hardware configuration of the image forming apparatus 10 is not limited to the configuration of FIG. 3. For example, the NIC 306 may be coupled to the PCI bus 330. Furthermore, the NIC 306 may be coupled to the network 9 in a wired manner or may be coupled to the network 9 in a wireless manner by a wireless LAN, etc.

Furthermore, a Digital Service Unit (DSU) or a modem for coupling the image forming apparatus 10 to the telephone network may be included, instead of the NIC 306 or together with the NIC 306. A communication device for coupling to a mobile phone network may be included.

Figure 4:
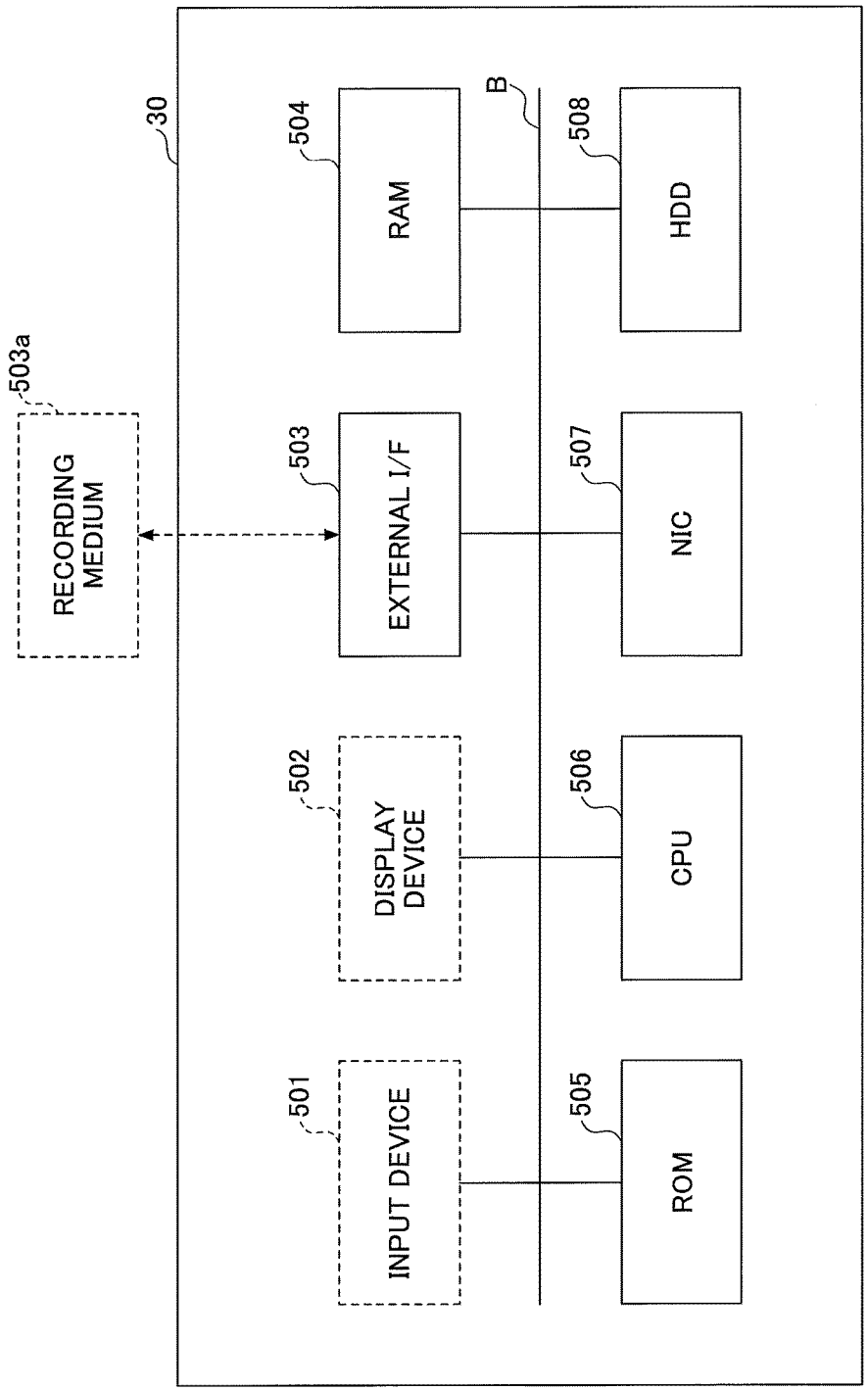
FIG. 4 is a hardware block diagram of a server according to an embodiment of the present invention.

FIG. 4 is a hardware block diagram of the server 30 according to the present embodiment. The server 30 includes an input device 501, a display device 502, an external interface (I/F) 503, a RAM 504, a read-only memory (ROM) 505, a CPU 506, a NIC 507, and a hard disk drive (HDD) 508, etc., which are interconnected by a bus B. Note that the input device 501 and the display device 502 may be in a form of being coupled and used according to need.

The input device 501 includes a keyboard, a mouse, and a touch panel, etc., and is used by the user for inputting operation signals. The display device 502 includes a display, etc., and displays processing results obtained by the server 30.

The NIC 507 is a communication device for coupling the server 30 to the LAN. The NIC 507 is the same as the NIC 306 of the image forming apparatus 10.

The HDD 508 is an example of a non-volatile storage device storing programs and data. The stored programs and data include, for example, an operating system (OS) that is the basic software controlling the entire server 30, and application software (hereinafter, simply referred to as "applications") for supplying various functions in the OS. Note that the server 30 may include a drive device using a flash memory as the recording medium (for example, a solid state drive (SSD)), instead of the HDD 508.

The external I/F 503 is an interface between the server 30 and an external device. An example of the external device is a recording medium 503a. Accordingly, the server 30 is able to read from and/or write in the recording medium 503a via the external I/F 503. Examples of the recording medium 503a are a flexible disk, a compact disk (CD), digital versatile disk (DVD), a secure digital (SD) memory card, and a universal serial bus (USB) memory, etc.

The ROM 505 is an example of a non-volatile semiconductor memory (storage device) that can store programs and data even after the power is turned off. The ROM 505 stores programs and data such as a basic input/output system (BIOS) that is executed when the server 30 is activated, OS settings, and network settings, etc. The RAM 504 is an example of a volatile semiconductor memory (storage device) that temporarily stores programs and data (packets).

The CPU 506 is an arithmetic device that loads programs and data from a storage device such as the ROM 505 and the HDD 508 into the RAM 504, and executes processes to control the entire server 30 and realize functions of the server 30.

Note that the hardware elements of the server 30 in FIG. 4 do not need to be accommodated in a single housing case or provided collectively as a single device. These elements indicate the hardware elements that are preferably provided in the server 30. Furthermore, in order to respond to cloud computing, the physical configuration of the server 30 according to the present embodiment may not be fixed; hardware resources may be dynamically connected or disconnected according to the load.

<Functional Configuration of Image Forming Apparatus 10>

Figure 5:
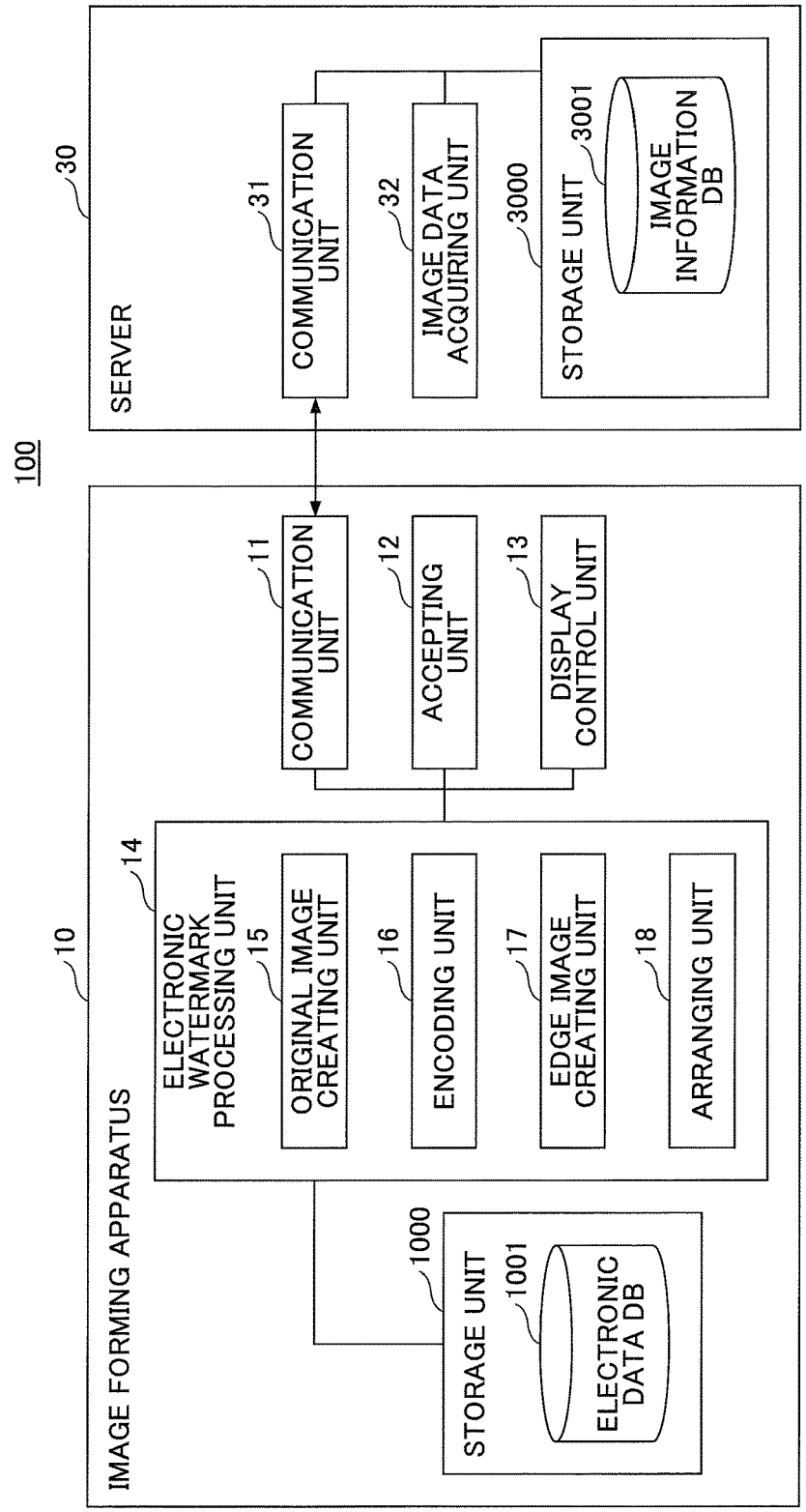
FIG. 5 is an example of a functional configuration of the image forming apparatus and the server included in the image processing system according to an embodiment of the present invention.

FIG. 5 is an example of a functional configuration of the image forming apparatus 10 and the server 30 included in the image processing system 100 according to the present embodiment. The image forming apparatus 10 includes a communication unit 11, an accepting unit 12, a display control unit 13, and an electronic watermark processing unit 14. These units are functions or means that are realized as any of the elements illustrated in FIG. 3 operate according to instructions from the CPU 301 following programs loaded in the SDRAM 302 from the flash memory 303 or the HDD 304.

Furthermore, the image forming apparatus 10 includes a storage unit 1000 that is constructed by the flash memory 303, the HDD 304, or the SDRAM 302 illustrated in FIG. 3. The storage unit 1000 stores an electronic data database (DB) 1001. The electronic data DB 1001 stores detailed information including the electronic data that is arranged as an electronic watermark. In addition to the above detailed information, for example, the time and date of executing a print job, the content of a print job, and user information of the user who has logged in (user name and department, etc.) may also be detailed information. Furthermore, the user can input detailed information that the user wants to store together with the image with a watermark in the server 30, from the operation panel 307.

(Functional Configurations of Image Forming Apparatus 10)

The communication unit 11 of the image forming apparatus 10 is mainly realized by processes performed by the CPU 301 and the NIC 306 illustrated in FIG. 3. The communication unit 11 sends and receives various kinds of data with the server 30 via the network 9. Note that in the following, even when the image forming apparatus 10 communicates with the server 30, the description of "via the communication unit 11" may be omitted.

The accepting unit 12 is mainly realized by processes performed by the CPU 301 and the operation panel 307 illustrated in FIG. 3. The accepting unit 12 accepts various operations from the user.

The display control unit 13 is mainly realized by processes performed by the CPU 301 and the operation panel 307 illustrated in FIG. 3. The display control unit 13 generates a screen to be displayed on the operation panel 307, and displays the generated screen on the operation panel 307.

The electronic watermark processing unit 14 is mainly realized by processes performed by the CPU 301 illustrated in FIG. 3. The electronic watermark processing unit 14 performs various processes relevant to electronic watermarks. The electronic watermark processing unit 14 includes an original image creating unit 15, an encoding unit 16, an edge image creating unit 17, and an arranging unit 18.

The original image creating unit 15 converts print data into image data. First, application software such as word processing software creates document data at a client terminal such as a Personal Computer (PC). A printer driver operating in the same PC converts the document data into print data described in a Page Description Language (PDL). The original image creating unit 15 analyzes the print data and converts the print data into image data such as a bitmap. This image data corresponds to an original image. Note that when the original image is generated by scanning an original document, the original image creating unit 15 does not need to be included.

The encoding unit 16 encodes the electronic data according to a certain rule. For example, the encoding unit 16 compresses the electronic data, or makes the electronic data redundant by check sum or hamming encoding. As encoding methods, Huffman coding and Run Length Encoding (RLE), etc., are known; however, the encoding method is not so limited.

The edge image creating unit 17 performs an edge process on the original image to create an edge image. To create an edge image, a known filter appropriate for edge detection may be used, such as Sobel and Laplacian, etc.; however, the filter is not so limited. An edge is the portion where the brightness (density) or the color rapidly changes in the image.

The arranging unit 18 arranges the dot d near an edge position in a rectangular area in which the dot d is to be arranged. An image data created in this way corresponds to the image with a watermark described above.

(Functional Configurations of Server 30)

The server 30 includes a communication unit 31 and an image data acquiring unit 32. These units are functions or means that are realized as any of the elements illustrated in FIG. 4 operate according to instructions from the CPU 506 following programs loaded in the RAM 504 from the HDD 508.

Furthermore, the server 30 includes a storage unit 3000 that is constructed by the HDD 508 or the RAM 504 illustrated in FIG. 4. The storage unit 3000 stores an image information DB 3001. The image information DB 3001 stores an image with a watermark in association with an image ID, etc.

The communication unit 31 of the server 30 is mainly realized by processes performed by the CPU 506 and the NIC 507 illustrated in FIG. 4. The communication unit 31 sends and receives data with the image forming apparatus 10 via the network 9. Note that in the following, even when the server 30 communicates with the image forming apparatus 10, the description of "via the communication unit 31" may be omitted.

The image data acquiring unit 32 is mainly realized by processes performed by the CPU 506 illustrated in FIG. 4. The image data acquiring unit 32 acquires an image with a watermark and detailed information sent from the image forming apparatus 10, assigns an image ID, and registers the image with a watermark and detailed information and the image ID in association with each other in the image information DB 3001.

<Arrangement Example of Dot d Included in Electronic Watermark>

Figure 6A:
Figure 6B:
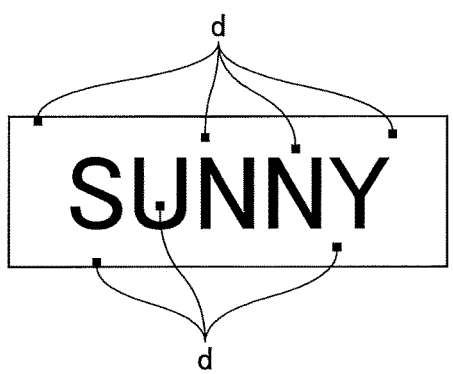
Figure 6C:
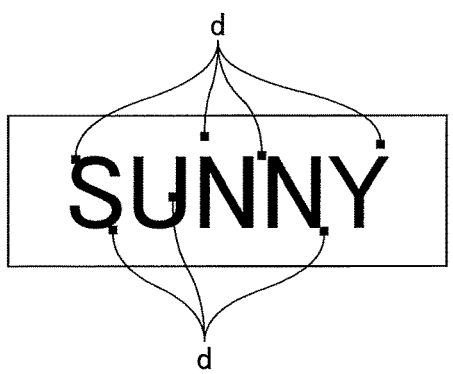

FIGS. 6A through 6C are for describing arrangement examples of the dot d included in an electronic watermark. FIG. 6A illustrates an example of an original image, which is an image before the dot d is arranged. FIG. 6B illustrates an example of an image with a watermark in which dots d are randomly arranged; FIG. 6B is a comparison example to be compared with the image with a watermark created by the method of arranging dots d according to the present embodiment. FIG. 6C illustrates an example of an image with a watermark according to the present embodiment, in which the dots d are arranged near characters (that is, edges).

As can be clearly seen by comparing FIG. 6B and FIG. 6C, when the dots d are arranged near characters (edges), the dots d are less conspicuous.

<Arrangement Positions of Dots d>

Figure 7:
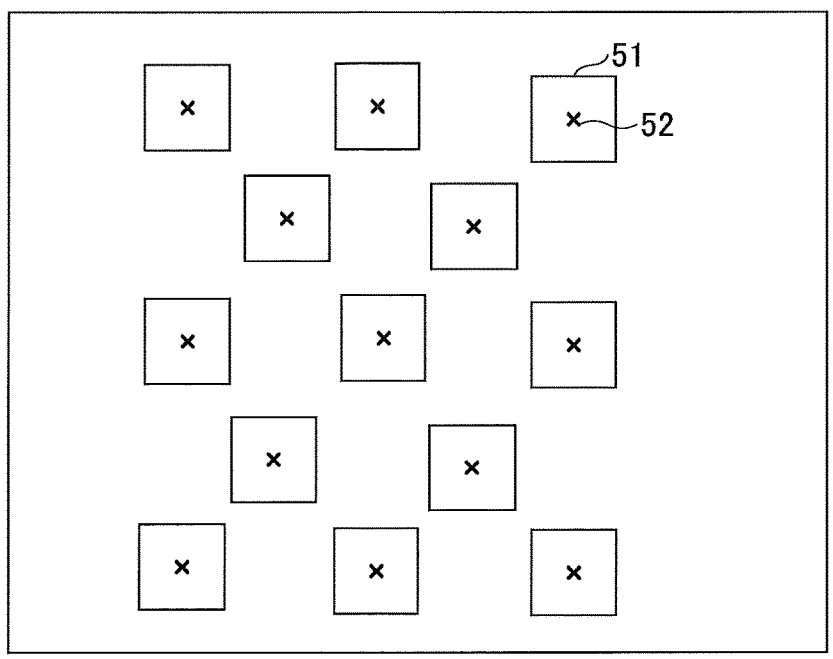
FIG. 7 is for describing candidate arrangement positions where dots are arranged in an original image according to an embodiment of the present invention.

FIG. 7 is for describing candidate arrangement positions 52 were dots d are arranged in an original image. FIG. 7 illustrates the original image or the overall sheet on which the original image is printed. The arranging unit 18 of the image forming apparatus 10 determines the candidate arrangement positions 52 of the dots d based on the size and the resolution of the original image. For example, the candidate arrangement positions 52 are at the positions dividing the resolution in the horizontal direction by three or four, at the division positions dividing the resolution in the vertical direction by six. FIG. 7 illustrates the candidate arrangement positions 52 in the original image such that there are three positions, two positions, three positions, two positions, and three positions in each row starting from the top of the original image.

The arranging unit 18 creates a rectangular area 51 around the center of each candidate arrangement position 52. In this example, the rectangular area 51 is a square in which the horizontal length and the vertical length are the same. In this rectangular area 51, the image forming apparatus 10 performs binarization, detects edges, and determines the arrangement position. However, the binarization and the detection of edges may be performed before determining the rectangular area 51. However, by performing the binarization and the detection of edges only for the rectangular area 51, the processing load of the image forming apparatus 10 can be reduced.

Furthermore, the above method of determining the candidate arrangement positions 52 is merely one example; the original image or the entire sheet may be divided into squares, into rectangles, or into circles. Furthermore, the number of divisions in the vertical or horizontal direction is not limited to three or two. Furthermore, the number of divisions in the horizontal direction at each division position in the vertical direction, may be the same at the respective division positions in the vertical direction. Furthermore, there may be three or more types of division number arrangements in the horizontal direction (in the example of FIG. 7, there are two division number arrangements, i.e., 3 or 2) at the respective division positions in the vertical direction.

As described above, as the method of determining the rectangular areas 51 is determined, the rectangular areas 51 are generated at the same positions in images having the same size or resolution. Therefore, the image forming apparatus 10 is able to read the dots d from the image with a watermark.

<Determination of Arrangement Positions>

Figure 8A:
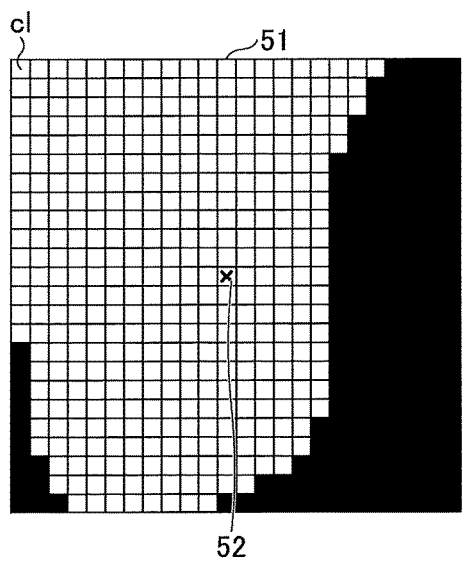
FIGS. 8A through 8C illustrate a method of determining an arrangement position according to an embodiment of the present invention.
Figure 8B:
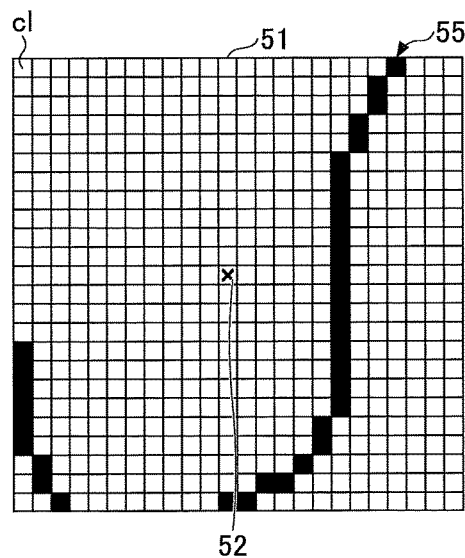
Figure 8C:
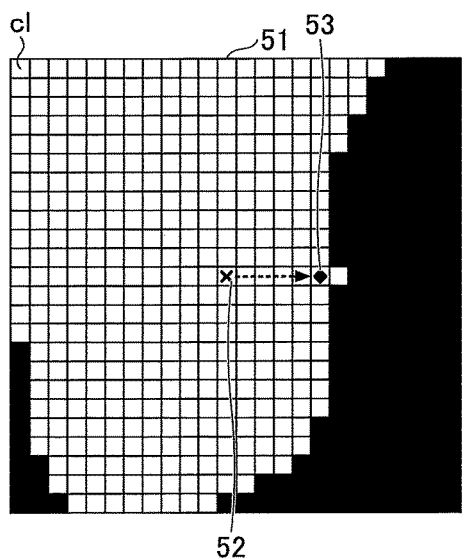

A description is given of a method of determining the arrangement positions, by referring to FIGS. 8A through 8C. FIGS. 8A through 8C respectively illustrate the rectangular area 51 described by referring to FIG. 7. FIG. 8A illustrates an original image in which the rectangular area 51 is binarized, and the center of the rectangular area 51 is the candidate arrangement position 52 of the dot d. The horizontal direction and the vertical direction of the rectangular area 51 are divided according to the resolution. Each of the areas obtained by the division is referred to as a cell c1.

FIG. 8B illustrates an example of an edge image. As illustrated in FIG. 8B, the black pixels, which are detected at the boundary between the white pixels and the black pixels in FIG. 8A, are an edge 55. The arranging unit 18 determines the arrangement position based on the edge image.

FIG. 8C is for describing an example of an arrangement position determined in the original image. For example, the arrangement position is determined as follows.

Figure 9:
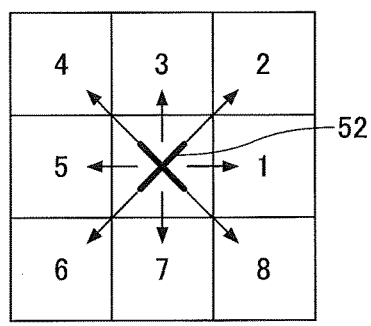
FIG. 9 illustrates examples of detection directions of an edge according to an embodiment of the present invention.

(i) The arranging unit 18 determines the arrangement position near an edge nearest to the candidate arrangement position 52. FIG. 9 illustrates the detection directions of an edge. There may be edges in eight directions with respect to the candidate arrangement position 52. The arranging unit 18 arranges the dot d near the nearest edge among the eight directions, with respect to the candidate arrangement position 52. Note that when there are a plurality of edges at the shortest distance, an edge, which is in a direction defined in advance, is prioritized. By determining the edge that is nearest from the center as the arrangement position, the distance between the center and the dot d becomes short. Therefore, even when the printed matter is stained, it is possible to avoid a situation where a stain is erroneously detected as and edge, when decoding the electronic watermark.

(ii) The arranging unit 18 searches for edges in the respective directions according to a priority order defined in advance with respect to the candidate arrangement position 52. When an edge is detected, the arranging unit 18 arranges the dot d near the edge in the direction of the detected edge. The priority order is determined, for example, as indicated by numbers in FIG. 9. The arranging unit 18 searches for an edge in directions that are defined in advance, and therefore the arrangement position can be determined without detecting a distance.

FIG. 8C illustrates that the edge in the right direction from the candidate arrangement position 52 is the nearest edge, and therefore the cell c1, which is adjacent on the left of the edge, is selected as an arrangement position 53 of the dot d.

That is, the cell c1, which is nearest to the edge 55, is selected as the arrangement position 53 of the dot d. Note that the edge 55 and the arrangement position 53 do not have to be adjacent to each other, as long as the dot d is within a predetermined range from the edge 55 so as not to be conspicuous. For example, the arrangement position 53 may be within an N number of cells from the edge 55 (N being a natural number).

Note that the black pixel on the right of the arrangement position 53 is inverted to a white pixel. When inverting a black pixel to a white pixel, the pixel, which is adjacent to the arrangement position 53 and which is along a linear direction connecting the dot d and the center, is inverted to a white pixel. This is done to avoid a situation where the dot d becomes connected to the edge and becomes buried in the edge. By inverting a black pixel to a white pixel as described above, it is possible to indicate that the dot d is detected, when the next pixel in the direction connecting the center and the dot is a white pixel. Accordingly, the precision in detecting the dot d can be increased. If the arrangement position 53 is arranged at a second cell from the edge 55, the above inverting process is unnecessary.

However, the black pixel of a cell adjacent to the arrangement position 53 does not have to be inverted to a white pixel. That is, the image forming apparatus 10 may determine that an edge, which is found by searching from the center, to be the dot d.

When inverting a black pixel near the dot into a white pixel, all of the eight black pixels surrounding the dot d may be inverted into white pixels.

By arranging the dot d near an edge, the character and the dot d appears to be integrated, and therefore the dot d can be made inconspicuous.

FIG. 10 is for describing an example of the dot d when the arrangement position 53 is a black pixel. FIG. 10 illustrates an example of an original image. The edge is detected along the boundary of white pixels and black pixels, and therefore there may be cases where the cell c1, which is adjacent to the edge, is a black pixel. In this case, the dot d will be buried in black pixels, and when the image forming apparatus 10 creates an edge image when decoding the electronic data, the dot d cannot be detected. Therefore, the arranging unit 18 inverts the black pixel of the cell of the arrangement position 53, into a white pixel, and arranges the dot d. Accordingly, it is possible to avoid a situation where the dot d is buried in black pixels. Note that in this case, the white dot d will indicate information (will have meaning).

<Operation Procedures>

Figure 11:
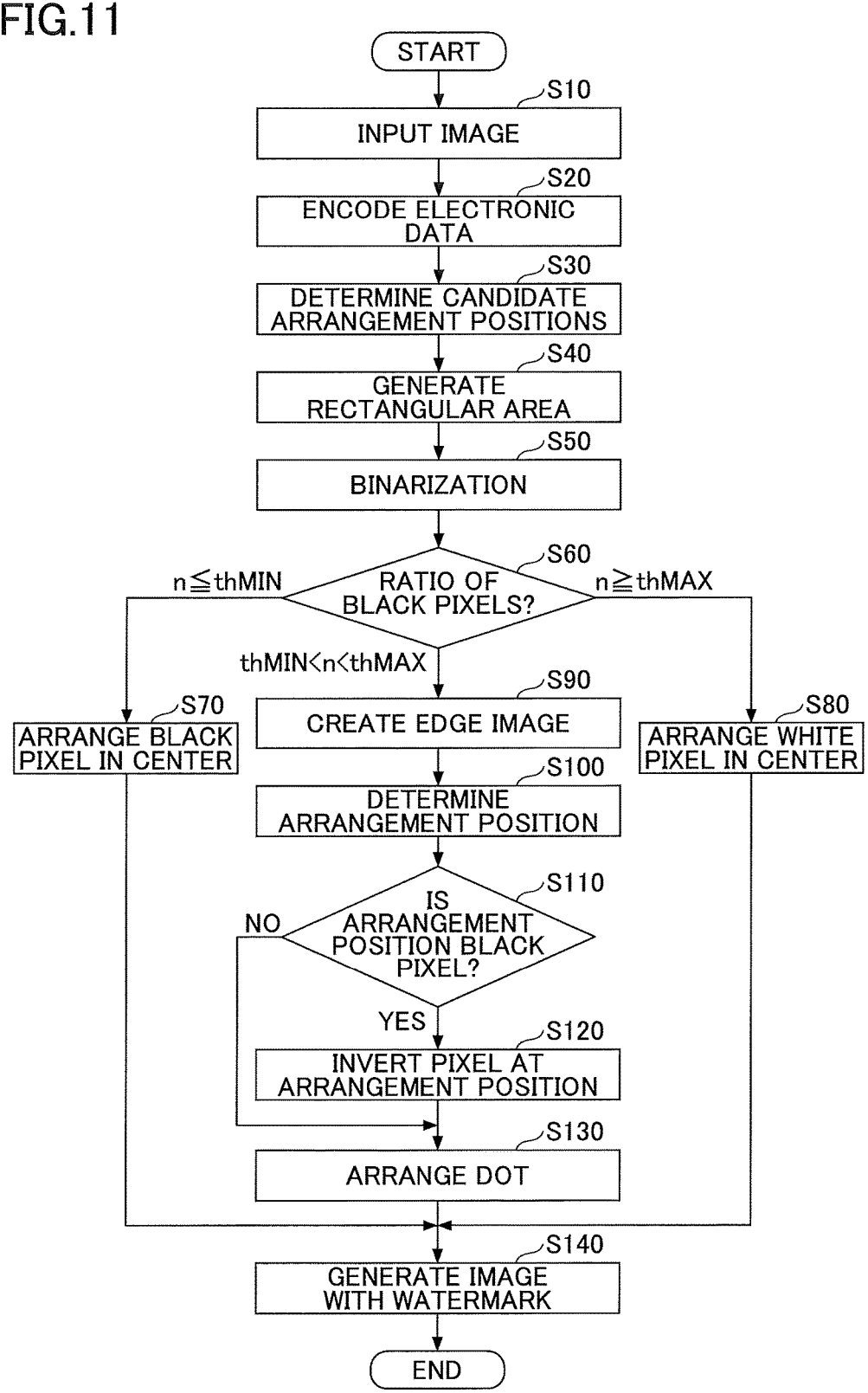
FIG. 11 is an example of a flowchart indicating the operation procedures of the image forming apparatus according to an embodiment of the present invention.

FIG. 11 is an example of a flowchart indicating the operation procedures of the image forming apparatus 10. The flowchart of FIG. 11 starts, for example, as a user performs an operation for arranging an electronic watermark and printing the image.

First, an original image is input (step S10). That is, the original image is created from print data, or the original image is read by a scanning operation.

Next, the encoding unit 16 creates electronic data associated with the original image, and encodes the electronic data (step S20).

Then, the arranging unit 18 determines the candidate arrangement positions 52 based on coordinates defined in advance according to the size and the resolution of the image (step S30). For example, when the size of the electronic data after encoding is 30 bytes (=240 bits), 240 candidate arrangement positions 52 are determined.

Next, the arranging unit 18 generates the rectangular area 51, having the candidate arrangement position 52 as the center of the rectangular area 51 (step S40).

Next, the edge image creating unit 17 performs a binarization process on the image in each rectangular area 51 (step S50). Accordingly, the arranging unit 18 can obtain the ratio of black pixels, for each rectangular area 51.

The arranging unit 18 determines the ratio of black pixels (step S60). This determination is made to change the process with respect to the arrangement position, depending on the ratio of black pixels. The ratio of black pixels can be obtained by the following formula.

ratio of black pixels=number of black pixels in rectangular area 51/number of pixels in rectangular area 51

When the ratio of black pixels is less than or equal to a black pixel minimum threshold thMIN, the arranging unit 18 determines that the rectangular area 51 is substantially a white image, and arranges a black dot d at the center of the rectangular area (step S70). Details are described below by referring to FIGS. 12A and 12B; for example, when the size of the rectangular area 51 is 16×16=256 pixels and the black pixel minimum threshold thMIN is 0.1 (=10%), and the number of black pixels is less than or equal to 25 pixels, the arranging unit 18 determines that the rectangular area 51 is substantially a white image.

When the ratio of black pixels is greater than or equal to a black pixel maximum threshold thMAX, the arranging unit 18 determines that the rectangular area 51 is substantially a black image, and arranges a white dot d in the center of the rectangular area 51 (step S80). That is, when the rectangular area 51 is substantially a black image, and a black dot is arranged as the dot d in the rectangular area 51, a black pixel in the original image cannot be determined, and it is difficult to detect an electronic watermark. Therefore, the arranging unit 18 arranges a white dot in the rectangular area 51 that is substantially a black image. For example, when the size of the rectangular area 51 is 16×16=256 pixels and the black pixel minimum threshold thMIN is 0.9 (=90%), and the number of black pixels is greater than or equal to 231 pixels, the arranging unit 18 determines that the rectangular area 51 is substantially a black image.

As described above, when the arranging unit 18 determines that the rectangular area 51 is substantially a white image or substantially a black image, the extraction of an edge image and the determination of the arrangement position 53 can be omitted, and therefore the processing speed can be increased. Furthermore, when the rectangular area 51 is substantially a white image or substantially a black image, there are cases where an edge cannot be detected from the rectangular area 51; however, the dot d can be arranged in the rectangular area 51 without detecting an edge.

When the ratio of black pixels is greater than the black pixel minimum threshold thMIN, and less than the black pixel maximum threshold thMAX, the edge image creating unit 17 creates an edge image (step S90).

Then, the arranging unit 18 determines the arrangement position of the dot d based on the edge image (step S100). Details are as described above by referring to FIGS. 8A through 9.

Next, the arranging unit 18 determines whether the position of the dot d determined in step S90 is a black pixel (step S110). As described by referring to FIG. 10, the arranging unit 18 refers to the original image to determine whether the position of the dot d is a black pixel.

When the position of the dot d is a black pixel (YES in step S110), the arranging unit 18 inverts the pixel of the arrangement position in the original image (step S120). That is, the arranging unit 18 changes the black pixel to a white pixel.

Then, the arranging unit 18 arranges the dot d at the coordinates determined in step S90 (step S130).

The above process is performed for each rectangular area 51. The arranging unit 18 decodes the dots d read from the rectangular areas 51, and acquires the electronic data (step S140).

As described above, the dot d can be arranged near an edge position, and therefore the dot d can be made inconspicuous. Furthermore, in order to prevent the dot d from being buried in the black pixels, the black pixel of the arrangement position can be changed to a white pixel. Furthermore, when the rectangular area 51 is a substantially black image, the pixel of the candidate arrangement position 52 can be inverted and the dot d can be arranged in the inverted pixel.

<Examples of Substantially Black Image and Substantially White Image>

Figure 12A:
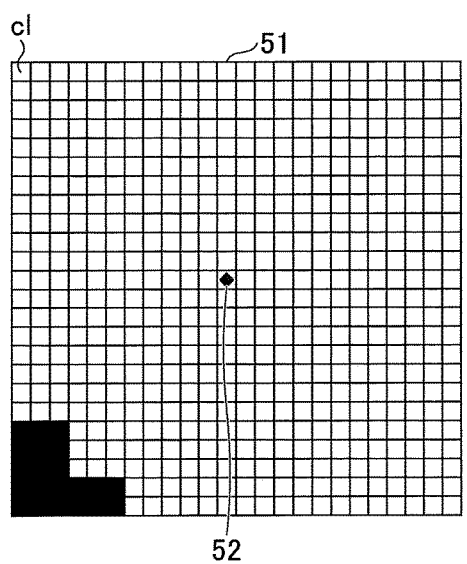
FIGS. 12A and 12B respectively illustrate examples of a substantially white image and a substantially black image according to an embodiment of the present invention.
Figure 12B:
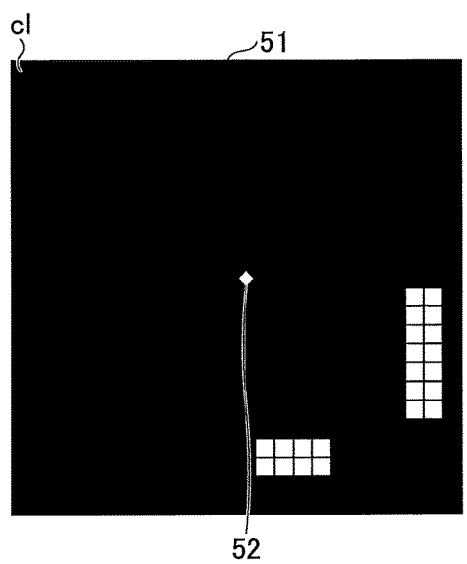

FIGS. 12A and 12B respectively illustrate examples of a substantially white image and a substantially black image. FIG. 12A illustrates a substantially white image and FIG. 12B illustrates a substantially black image. In FIG. 12A, the rectangular area 51 is substantially a white image, and therefore the candidate arrangement position 52 that is at the center of the rectangular area 51 is the position of the dot d. In FIG. 12B, the rectangular area 51 is substantially a black image, and the candidate arrangement position 52 that is at the center of the rectangular area 51 is the position of the dot d; however, a white image is arranged at the therefore candidate arrangement position 52 such that the dot d does is not buried in black pixels.

Note that in a case where the rectangular area 51 is substantially a white image, the arranging unit 18 may arrange the dot d near an edge position. That is, when the rectangular area 51 is not completely a white image, an edge is highly likely to be detected, and the dot d can be arranged near the edge position. Accordingly, even if the processing load increases, the dot d can be made inconspicuous.

<Decoding of Electronic Watermark>

Figure 13:
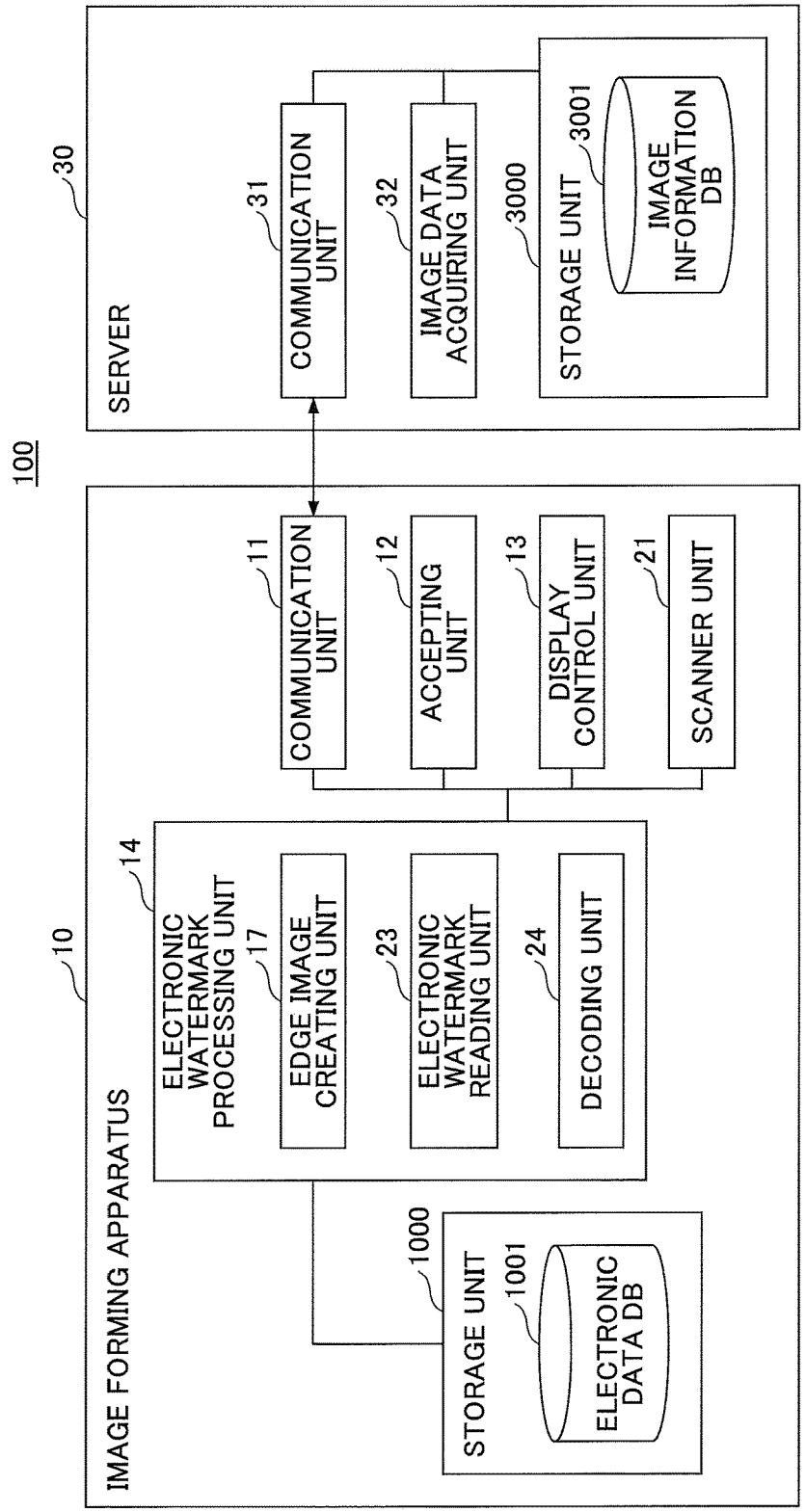
FIG. 13 is an example of a functional block diagram of the image forming apparatus, relevant to the decoding of the electronic watermark according to an embodiment of the present invention.

FIG. 13 is an example of a functional block diagram of the image forming apparatus 10, relevant to the decoding of the electronic watermark. Note that the differences between FIG. 13 and FIG. 5 are mainly described. The image forming apparatus 10 illustrated in FIG. 13 includes a scanner unit 21. The scanner unit 21 is mainly realized by processes performed by the CPU 301 and the scanner engine 312 illustrated in FIG. 3. The scanner unit 21 optically reads printed matter, on which an image with a watermark is printed, and converts the image into image data. As a matter of convenience, this image data is also referred to as an image with a watermark.

Furthermore, the electronic watermark processing unit 14 of FIG. 13 includes an electronic watermark reading unit 23 and a decoding unit 24. The electronic watermark reading unit 23 reads an electronic watermark from an image with a watermark. The procedures of reading an electronic watermark from an image with a watermark are performed in a reversed order with respect to the order of performing the procedures of arranging an electronic watermark; however, substantially the same procedures are performed. That is, the decoding unit 24 decodes the electronic data by using the certain rule in an opposite way to the case of encoding the electronic data.

The decoding unit 24 decodes the electronic watermark that has been read by the electronic watermark reading unit 23, to acquire electronic data.

<Rectangular Area 51 of Image with Watermark>

FIGS. 14A and 14B are for describing the operation of reading of an electronic watermark. FIG. 14A illustrates an image with a watermark. By the above process, dots d are arranged near the characters. The electronic watermark reading unit 23 reads these dots d. The electronic watermark reading unit 23 sets the rectangular areas 51 by the same processes as those performed by the arranging unit 18. FIG. 14B illustrates an image with a watermark in which rectangular areas 51 are set. The electronic watermark reading unit 23 reads an electronic watermark from the rectangular area 51. That is, the electronic watermark reading unit 23 performs binarization, detection of edges, and identification of arrangement positions, with respect to the rectangular area 51.

<Identification of Dot d (Arrangement Position)>

Figure 15A:
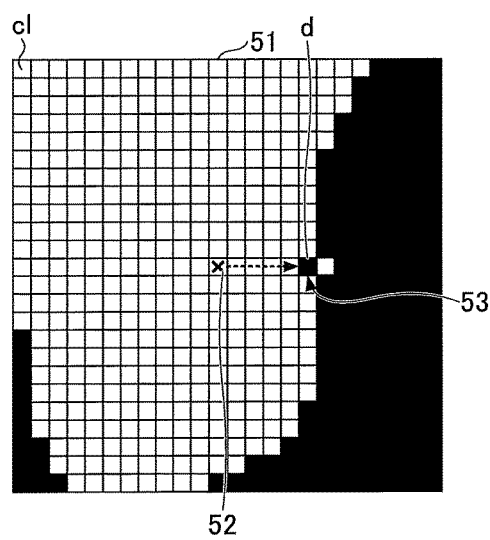
FIGS. 15A and 15B are for describing the method of identifying the position of a dot according to an embodiment of the present invention.
Figure 15B:
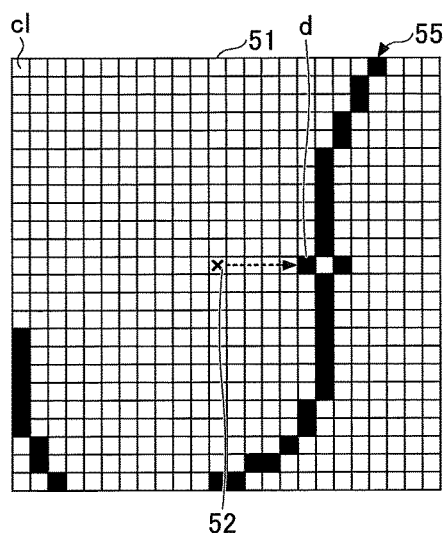

FIGS. 15A and 15B are for describing the method of identifying the arrangement position in which the dot d is arranged. FIG. 15A is an image with a watermark that has been binarized, and the dot d is arranged at the arrangement position 53 determined in FIG. 8C. FIG. 15B illustrates an example of an edge image. As illustrated in FIG. 15B, the black pixels, which are detected at the boundary between white pixels and black pixels in FIG. 15A, correspond to the edge.

The dot d is supposed to be present at the position nearest to the center of the rectangular area 51, or in the direction determined in advance. Therefore, the electronic watermark reading unit 23 acquires, as the dot d, a black pixel that is at a position nearest to the center of the rectangular area 51, or a black pixel in the direction determined in advance. Furthermore, in the original image, when the pixel, which is next to the black pixel that is at a position nearest to the center or which is next to the black pixel in the direction determined in advance, is a white pixel, the electronic watermark reading unit 23 acquires the black pixel as the dot d. Accordingly, it is possible to avoid a situation where a smear is erroneously detected as the dot d.

Note that the electronic watermark reading unit 23 determines whether to consider either 0 or 1 as a dot, depending on the center of the rectangular area 51. For example, when the pixels surrounding the center are substantially white pixels, the electronic watermark reading unit 23 considers 1 to be a dot; when the pixels surrounding the center are substantially black pixels, the electronic watermark reading unit 23 considers 0 to be a dot.

Furthermore, in the case of a substantially black image or a substantially white image, the electronic watermark reading unit 23 is to read the dot d from the center of the rectangular area 51. When the rectangular area 51 is not substantially a black image, but the dot d is inverted to a white pixel (in the case of FIG. 10), the electronic watermark reading unit 23 reads the white pixel at the arrangement position.

<Operation Procedures>

FIG. 16 is an example of a flowchart indicating the operation procedures performed by the image forming apparatus 10 when decoding an electronic watermark. The flowchart of FIG. 16 starts, for example, as a user performs an operation to cause the image forming apparatus 10 to scan an image with a watermark. Note that the differences between FIG. 16 and FIG. 11 are mainly described.

First, an original image is input (step S10). That is, the scanner unit 21 of the image forming apparatus 10 reads the image with a watermark and creates an image with a watermark.

Next, the electronic watermark reading unit 23 determines the candidate arrangement position 52 based on coordinates defined in advance according to the size and the resolution of the image (step S30).

Next, the electronic watermark reading unit 23 creates the rectangular area 51, having the candidate arrangement position 52 as the center of the rectangular area 51 (step S40).

Next, the electronic watermark reading unit 23 performs a binarization process on the image in each rectangular area 51 (step S50). Accordingly, the electronic watermark reading unit 23 can obtain the ratio of black pixels, for each rectangular area (step S60).

When the ratio of black pixels is less than or equal to the black pixel minimum threshold thMIN (less than or equal to the minimum black pixel threshold), the electronic watermark reading unit 23 determines that the rectangular area 51 is substantially a white image, and reads the dot d of the black pixel at the center of the rectangular area 51 (step S70).

When the ratio of black pixels is greater than or equal to the black pixel maximum threshold thMAX (greater than or equal to the maximum black pixel threshold), the electronic watermark reading unit 23 determines that the rectangular area 51 is substantially a black image, and reads the dot d of the white pixel at the center of the rectangular area (step S80).

Also in the case of the decoding process, when the electronic watermark reading unit 23 determines that the rectangular area 51 is substantially a white image or substantially a black image, the extraction of an edge image and the determination of the arrangement position can be omitted, and therefore the processing speed can be increased.

When the ratio of black pixels is greater than the black pixel minimum threshold thMIN, and less than the black pixel maximum threshold thMAX, the edge image creating unit 17 creates an edge image (step S90).

Then, the electronic watermark reading unit 23 identifies the position of the dot d based on the edge image (step S100).

Next, the electronic watermark reading unit 23 determines whether the position of the dot d identified in step S90 is a black pixel in the original image (step S110).

When the position of the dot d is a black pixel (YES in step S110), the electronic watermark reading unit 23 reads the black pixel of the pixel determined in step S100, from the image with a watermark (step S120). In this case, when the pixel next to the black pixel is a white pixel, the black pixel may be read as the dot d.

When the position of the dot d is a white pixel (NO in step S110), the electronic watermark reading unit 23 reads the dot d of the white pixel from the image with a watermark (step S130). That is, as described by referring to FIG. 10, the black pixel has been inverted to a white pixel, and therefore the electronic watermark reading unit 23 reads the white pixel as a black pixel. In this case, when the eight pixels around the white pixel are black pixels, the electronic watermark reading unit 23 may read the white pixel as the dot d.

Next, the decoding unit 24 sequentially integrates the dots of all of the rectangular areas 51, and decodes the electronic data from the electronic watermark (step S140).

As described above, the electronic watermark can be read by substantially the same procedures as those performed when arranging an electronic watermark.

<Overview>

As described above, the image forming apparatus 10 according to the present embodiment arranges a dot near the edge obtained from an original image, and can thus make the dot inconspicuous. Even when the arrangement position of the dot d is a black pixel, the dot d can be arranged. Furthermore, in the case of a substantially black image or a substantially white image, the dot d can be arranged.

Other Application Examples

The information processing apparatus and the data arrangement method are not limited to the specific embodiments described in the detailed description, and variations and modifications may be made without departing from the spirit and scope of the present invention.

For example, in the above embodiments, the dot d is described as a black pixel; however, the dot d may be a color (C, M, and Y) pixel.

Furthermore, for example, the edge image creating unit 17 may change the edge intensity and the filter to create a plurality of edge images from a single rectangular area 51. Accordingly, the density of the dot d may be increased. Furthermore, a common edge position may be identified by the plurality of edge images created by changing the edge intensity and the filter, and the dot d may be arranged near the identified edge position.

Furthermore, in the present embodiment, the image forming apparatus 10 arranges the dots d; however, an electronic whiteboard, a projector, or a TV conference terminal may arrange the dots d, and the image forming apparatus 10 may print the dots d.

Furthermore, the device for arranging the dots d and the device for printing the electronic watermark may be different devices. For example, a PC may arrange the dots d to form the electronic watermark, and the image forming apparatus 10 may print the electronic watermark. Alternatively, the image forming apparatus 10 may send an image and electronic data to a server, the server may arrange the dots d in the image and send the image to the image forming apparatus 10, and the image forming apparatus 10 may print the image.

Furthermore, the configuration examples of FIGS. 5 and 13 described in the embodiments above are divided according to the main functions to facilitate the understanding of processes by the image forming apparatus 10 and the server 30. The present invention is not limited by how the process units are divided or the names of the process units. The processes of the image forming apparatus 10 and the server 30 may be further divided into many process units according to the process contents. Furthermore, the process units may be divided such that a single process unit further includes many processes.

Furthermore, the database of the storage unit 1000 of the image forming apparatus 10 may be directly included in the image forming apparatus 10, and may be in a network in which the image forming apparatus 10 can read and write data. Furthermore, the detailed information including the electronic data may be directly input by a user. Furthermore, the database of the storage unit 3000 of the server 30 may be directly included in the server 30, and may be in the network 9 in which the server 30 can read and write data.

According to one embodiment of the present invention, an information processing apparatus, which is capable of creating an electronic watermark in which microscopic dots are inconspicuous, is provided.

What is claimed is:

1. An image forming apparatus including an information processing apparatus for arranging at least one dot, which expresses information relating to image data, in the image data, the information processing apparatus comprising:
processing circuitry configured to
create an edge image of the image data;
determine a position near an edge in the edge image to be a position of the at least one dot;
arrange the at least one dot at the determined position in the image data so as to form an electronic watermark in the image data, and
cause the image forming apparatus to output the image data and the electronic watermark including the arranged at least one dot,
wherein the determining of the position of the at least one dot includes automatically determining the position near the edge, which is nearest to a center of an area, as the position of the at least one dot, in the area having a predetermined position in the image data as the center of the area, and
wherein the arranging of the at least one dot includes automatically inverting a pixel, which is next to the at least one dot and which is along a direction connecting the center and the at least one dot, into a white pixel.

2. The image forming apparatus according to claim 1, wherein the determining of the position of the at least one dot includes determining the position near the edge, which is in a predetermined direction from a center of an area, as the position of the at least one dot, in the area having a predetermined position in the image data as the center of the area.

3. An image forming apparatus including an information processing apparatus for arranging at least one dot, which expresses information relating to image data, in the image data, the information processing apparatus comprising:
processing circuitry configured to
create an edge image of the image data;
determine a position near an edge in the edge image to be a position of the at least one dot;
arrange the at least one dot at the determined position in the image data so as to form an electronic watermark in the image data, and
cause the image forming apparatus to output the image data and the electronic watermark including the arranged at least one dot,
wherein the determining of the position of the at least one dot includes automatically determining the position near the edge, which is nearest to a center of an area, as the position of the at least one dot, in the area having a predetermined position in the image data as the center of the area, and
wherein the arranging of the at least one dot includes automatically arranging a black pixel at the center of the area instead of at the position near the edge, when a ratio of black pixels in the area is less than or equal to a minimum black pixel threshold.

4. An image forming apparatus including an information processing apparatus for arranging at least one dot, which expresses information relating to image data, in the image data, the information processing apparatus comprising:
processing circuitry configured to
create an edge image of the image data;
determine a position near an edge in the edge image to be a position of the at least one dot;
arrange the at least one dot at the determined position in the image data so as to form an electronic watermark in the image data, and
cause the image forming apparatus to output the image data and the electronic watermark including the arranged at least one dot,
wherein the determining of the position of the at least one dot includes automatically determining the position near the edge, which is nearest to a center of an area, as the position of the at least one dot, in the area having a predetermined position in the image data as the center of the area, and
wherein the arranging of the at least one dot includes automatically arranging a white pixel at the center of the area instead of at the position near the edge, when a ratio of black pixels in the area is greater than or equal to a maximum black pixel threshold.

5. An image forming apparatus including an information processing apparatus for arranging at least one dot, which expresses information relating to image data, in the image data, the information processing apparatus comprising:
processing circuitry configured to
create an edge image of the image data;
determine a position near an edge in the edge image to be a position of the at least one dot;
arrange the at least one dot at the determined position in the image data so as to form an electronic watermark in the image data, and
cause the image forming apparatus to output the image data and the electronic watermark including the arranged at least one dot,
wherein the determining of the position of the at least one dot includes automatically determining the position near the edge, which is nearest to a center of an area, as the position of the at least one dot, in the area having a predetermined position in the image data as the center of the area, and
wherein the arranging of the at least one dot includes automatically inverting the at least one dot into a white pixel and arranging the white pixel at the position near the edge, when the position of the at least one dot determined as being near the edge is a black pixel in the image data.

6. A data arrangement method executed by a computer, the data arrangement method comprising:
creating an edge image of the image data;
determining a position near an edge in the edge image to be a position of the at least one dot;
arranging the at least one dot at the determined position in the image data so as to form an electronic watermark in the image data, and
cause an image forming apparatus to output the image data and the electronic watermark including the arranged at least one dot,
wherein the determining of the position of the at least one dot includes automatically determining the position near the edge, which is nearest to a center of an area, as the position of the at least one dot, in the area having a predetermined position in the image data as the center of the area, and
wherein the arranging of the at least one dot includes automatically inverting a pixel, which is next to the at least one dot and which is along a direction connecting the center and the at least one dot, into a white pixel.

7. A non-transitory computer-readable recording medium storing a program that causes a computer to execute a process performed by an information processing apparatus included in an image forming apparatus for arranging at least one dot, which expresses information relating to image data, in the image data, the process comprising:
creating an edge image of the image data;
determining a position near an edge in the edge image to be a position of the at least one dot;
arranging the at least one dot at the determined position in the image data so as to form an electronic watermark in the image data, and
cause the image forming apparatus to output the image data and the electronic watermark including the arranged at least one dot,
wherein the determining of the position of the at least one dot includes automatically determining the position near the edge, which is nearest to a center of an area, as the position of the at least one dot, in the area having a predetermined position in the image data as the center of the area, and
wherein the arranging of the at least one dot includes automatically inverting a pixel, which is next to the at least one dot and which is along a direction connecting the center and the at least one dot, into a white pixel.

8. A data arrangement method executed by a computer, the data arrangement method comprising:
creating an edge image of the image data;
determining a position near an edge in the edge image to be a position of the at least one dot;
arranging the at least one dot at the determined position in the image data so as to form an electronic watermark in the image data, and
cause an image forming apparatus to output the image data and the electronic watermark including the arranged at least one dot,
wherein the determining of the position of the at least one dot includes automatically determining the position near the edge, which is nearest to a center of an area, as the position of the at least one dot, in the area having a predetermined position in the image data as the center of the area, and
wherein the arranging of the at least one dot includes automatically arranging a black pixel at the center of the area instead of at the position near the edge, when a ratio of black pixels in the area is less than or equal to a minimum black pixel threshold.

9. A data arrangement method executed by a computer, the data arrangement method comprising:
creating an edge image of the image data;
determining a position near an edge in the edge image to be a position of the at least one dot;
arranging the at least one dot at the determined position in the image data so as to form an electronic watermark in the image data, and
cause an image forming apparatus to output the image data and the electronic watermark including the arranged at least one dot,
wherein the determining of the position of the at least one dot includes automatically determining the position near the edge, which is nearest to a center of an area, as the position of the at least one dot, in the area having a predetermined position in the image data as the center of the area, and
wherein the arranging of the at least one dot includes automatically arranging a white pixel at the center of the area instead of at the position near the edge, when a ratio of black pixels in the area is greater than or equal to a maximum black pixel threshold.

10. A data arrangement method executed by a computer, the data arrangement method comprising:
creating an edge image of the image data;
determining a position near an edge in the edge image to be a position of the at least one dot;
arranging the at least one dot at the determined position in the image data so as to form an electronic watermark in the image data, and
cause an image forming apparatus to output the image data and the electronic watermark including the arranged at least one dot,
wherein the determining of the position of the at least one dot includes automatically determining the position near the edge, which is nearest to a center of an area, as the position of the at least one dot, in the area having a predetermined position in the image data as the center of the area, and
wherein the arranging of the at least one dot includes automatically inverting the at least one dot into a white pixel and arranging the white pixel at the position near the edge, when the position of the at least one dot determined as being near the edge is a black pixel in the image data.

11. A non-transitory computer-readable recording medium storing a program that causes a computer to execute a process performed by an information processing apparatus included in an image forming apparatus for arranging at least one dot, which expresses information relating to image data, in the image data, the process comprising:
creating an edge image of the image data;
determining a position near an edge in the edge image to be a position of the at least one dot;
arranging the at least one dot at the determined position in the image data so as to form an electronic watermark in the image data, and
cause the image forming apparatus to output the image data and the electronic watermark including the arranged at least one dot,
wherein the determining of the position of the at least one dot includes automatically determining the position near the edge, which is nearest to a center of an area, as the position of the at least one dot, in the area having a predetermined position in the image data as the center of the area, and
wherein the arranging of the at least one dot includes automatically arranging a black pixel at the center of the area instead of at the position near the edge, when a ratio of black pixels in the area is less than or equal to a minimum black pixel threshold.

12. A non-transitory computer-readable recording medium storing a program that causes a computer to execute a process performed by an information processing apparatus included in an image forming apparatus for arranging at least one dot, which expresses information relating to image data, in the image data, the process comprising:
creating an edge image of the image data;
determining a position near an edge in the edge image to be a position of the at least one dot;
arranging the at least one dot at the determined position in the image data so as to form an electronic watermark in the image data, and
cause the image forming apparatus to output the image data and the electronic watermark including the arranged at least one dot,
wherein the determining of the position of the at least one dot includes automatically determining the position near the edge, which is nearest to a center of an area, as the position of the at least one dot, in the area having a predetermined position in the image data as the center of the area, and wherein the arranging of the at least one dot includes automatically arranging a white pixel at the center of the area instead of at the position near the edge, when a ratio of black pixels in the area is greater than or equal to a maximum black pixel threshold.

13. A non-transitory computer-readable recording medium storing a program that causes a computer to execute a process performed by an information processing apparatus included in an image forming apparatus for arranging at least one dot, which expresses information relating to image data, in the image data, the process comprising:

creating an edge image of the image data;

determining a position near an edge in the edge image to be a position of the at least one dot;

arranging the at least one dot at the determined position in the image data so as to form an electronic watermark in the image data, and cause the image forming apparatus to output the image data and the electronic watermark including the arranged at least one dot, wherein the determining of the position of the at least one dot includes automatically determining the position near the edge, which is nearest to a center of an area, as the position of the at least one dot, in the area having a predetermined position in the image data as the center of the area, and wherein the arranging of the at least one dot includes automatically inverting the at least one dot into a white pixel and arranging the white pixel at the position near the edge, when the position of the at least one dot determined as being near the edge is a black pixel in the image data.

* * * * *